US 11,702,857 B2

(12) United States Patent
Sercel et al.

(10) Patent No.: US 11,702,857 B2
(45) Date of Patent: Jul. 18, 2023

(54) PNEUMATICALLY SUPPORTED TOWERS FOR LOW GRAVITY APPLICATIONS

(71) Applicant: Trans Astronautica Corporation, Lake View Terrace, CA (US)

(72) Inventors: Joel C. Sercel, Lake View Terrace, CA (US); James G. Small, Sonoita, AZ (US); Philip J. Wahl, Alta Dena, CA (US); Craig E. Peterson, Los Angeles, CA (US)

(73) Assignee: Trans Astronautica Corporation, Lake View Terrace, CA (US)

( * ) Notice: Subject to any disclaimer, the term of this patent is extended or adjusted under 35 U.S.C. 154(b) by 0 days.

(21) Appl. No.: 17/574,462

(22) Filed: Jan. 12, 2022

(65) Prior Publication Data
US 2022/0274721 A1    Sep. 1, 2022

Related U.S. Application Data

(60) Provisional application No. 63/260,141, filed on Aug. 10, 2021, provisional application No. 63/154,568, filed on Feb. 26, 2021.

(51) Int. Cl.
*B64G 1/22* (2006.01)
*E04H 12/00* (2006.01)
*E04B 1/343* (2006.01)

(52) U.S. Cl.
CPC ......... *E04H 12/00* (2013.01); *E04B 1/34357* (2013.01); *B64G 2001/224* (2013.01)

(58) Field of Classification Search
CPC ............... E04H 12/00; E04B 1/34357; B64G 2001/224
See application file for complete search history.

(56) References Cited

U.S. PATENT DOCUMENTS 3,606,211 A     9/1971  Roersch et al.
2007/0128582 A1  6/2007  Anderson et al.
(Continued)

FOREIGN PATENT DOCUMENTS

RU    2344973         1/2009
WO    WO-2008101346 A1 *  8/2008  ............. B64G 1/002
WO    WO-2011159345 A1 * 12/2011  ............... B64B 1/06

OTHER PUBLICATIONS

International Search Report and Written Opinion dated Jul. 7, 2022 in application No. PCT/US22/17758.

*Primary Examiner* — Babajide A Demuren
(74) *Attorney, Agent, or Firm* — Knobbe, Martens, Olson & Bear, LLP (57) ABSTRACT

Pneumatically supported towers for low gravity applications are disclosed herein. In one aspect, an inflatable tower for use in vacuum environments can have a membrane configured to support a load when inflated with an inflation gas to a pressures less than 100,000 pascals and greater than 0.01 pascal. The inflation gas can be chosen to have a sufficiently low boiling temperature at the inflation pressure of the membrane that the gas will not condense to a liquid or solid within a defined range of temperatures in which the tower is designed to operate. The membrane can be configured to be packaged for transport in deflated condition and rolled onto cylinders from which the membrane can be later unfurled and inflated as part of the tower inflation process. The membrane can be further configured to progressively inflate beginning at a bottom or lowest level of the membrane during the tower inflation process. The membrane can be divided into a plurality of compartments by one or more diaphragms containing valves configured to regulate flow of the inflation gas between the compartments.

30 Claims, 6 Drawing Sheets

(56) References Cited

U.S. PATENT DOCUMENTS

| | | |
|---|---|---|
| 2010/0163683 A1 | 7/2010 | Quine |
| 2011/0127382 A1 | 6/2011 | Im |
| 2016/0200551 A1* | 7/2016 | Izz ............................ B66B 9/02 |
| | | 187/250 |
| 2017/0129579 A1 | 5/2017 | De Jong |
| 2018/0280849 A1* | 10/2018 | Abahusayn ............... B64B 1/50 |
| 2022/0033112 A1* | 2/2022 | Bognar .................. B64G 1/222 |

* cited by examiner

PNEUMATICALLY SUPPORTED TOWERS FOR LOW GRAVITY APPLICATIONS

INCORPORATION BY REFERENCE TO ANY PRIORITY APPLICATIONS

This application is based upon and claims the benefit of priority from U.S. Provisional Patent Application No. 63/154,568 filed on Feb. 26, 2021 and claims the benefit of priority from U.S. Provisional Patent Application No. 63/260,141 filed on Aug. 10, 2021. Moreover, any and all applications for which a foreign or domestic priority claim is identified in the Application Data Sheet as filed with the present application are hereby incorporated by reference under 37 CFR 1.57. The entire contents of each of the above-listed items is hereby incorporated into this document by reference and made a part of this specification for all purposes, for all that each contains.

BACKGROUND

The present description relates to and discloses erecting inflatable tower structures (e.g., in space, lunar, and/or vacuum environments).

SUMMARY OF CERTAIN INVENTIVE ASPECTS

For industrial low gravity applications on moons and other celestial bodies, such as asteroids and comets, it is desirable to deploy high towers. Tower uses include but are not limited to: elevating mirrors or reflectors above the shadows cast by local terrain in order to reflect sunlight into otherwise permanently shadowed regions; elevating communication antennas above the line-of-sight obstructions of local terrain; elevating camera and surveillance sensors for search, identification, and tracking of local objects of interest. For clarity in the following discussion, certain examples are described in the context of lunar applications, however, aspects of this disclosure are not limited thereto. It is understood that towers in vacuum environments may also include celestial bodies with or without atmospheres with either high or low gravity conditions as well as artificial gravity conditions found in large rotating space platforms.

Towers can be designed to elevate a useful payload weight or mass. As towers are designed for progressively higher altitudes, the mass of the tower often exceeds the mass of the payload. Eventually, tower height is limited by the strength of the bottom portion of the tower to support its own weight and, on Earth, by wind loading forces. The absence of wind forces on the airless bodies such as the Moon allows inflated structures to support payloads with substantially less tower mass than lattice tower constructions or tensegrity rod-and-cable construction.

When launching materials from Earth or other planets, it is desirable to reduce launch weight and the associated weight-dependent launch costs whenever possible. Thin film inflated membranes used in tower construction are desirable both for reduced launch weight and for ease of assembly on the Moon, as described below.

Inflated structures can be used in space, including for applications such as solar concentrating reflectors, solar energy shields, reflectors, solar sails, antennas for microwave communication antennas and for solar arrays. Inflated structures can also be used as pressure containment envelopes for large space habitats.

Challenges include that, first, thin film inflated membranes, when containing substantial air pressure needed for life support, suffer from large gas leak rates requiring continuing makeup gas replenishment. The accurate calculation of gas flow through small orifices is complex and dependent on specific details of the orifice shape and the molecular properties of the gas. However, for a large pressure drop across a small orifice in the region of choked flow, the total mass leak rate is often proportional to the pressure drop. The low pressure towers of embodiments described herein may operate at pressures much lower that life support requirements and have proportionally lower leak rates by a factor of 1000 times or more.

Second, large diameter membranes that contain substantial pressure may involve supporting large hoop stresses as described below.

There may be a practical limit to the size of inflated structures that is determined by the strength of materials (e.g., to resist hoop stress). The inflated towers described herein can support large payloads with inflation pressures less than 0.001 times the sea level atmospheric pressure of Earth. Hoop stress forces are greatly reduced by the use of low inflation pressure. These structures are referred to herein as low-pressure inflatables. The application of low-pressure inflatables to large weight-bearing structures such as towers is described herein.

One aspect includes inflatable towers supported in vacuum environments taking advantage of low inflation pressure (for example using gas inflation pressures less than 100,000 pascals and greater than 0.01 pascal)—e.g., to minimize or reduce leakage rate. Thus, an inflatable tower for use in vacuum environments can comprise a membrane configured to support a load when inflated with an inflation gas to a pressure within this range.

In some embodiments, the inflation gas is chosen to have sufficiently low boiling temperature at the designed inflation pressure that the gas will not condense to a liquid or solid during anticipated temperature conditions (e.g., temperatures in which the tower is designed to operate, which may range widely, or be very low and/or high for space applications).

In some embodiments, flexible tower membranes are packaged for transport in deflated condition and rolled onto cylinders from which they can be later unfurled and inflated. This can be an integral part of the tower inflation process. Thus, a tower can have a membrane configured to be packaged for transport in deflated condition and rolled onto cylinders from which the membrane can be later unfurled and inflated (e.g., as part of the tower inflation process).

In some embodiments, the tower membrane can be folded (e.g., folded back and forth or fan-folded) rather than or in addition to being rolled onto a roller.

In some embodiments, the membrane is configured to be packaged for transport in deflated condition and the tower membrane is further configured to be folded back and forth such that the membrane can be later unfurled an inflated as part of the tower inflation process.

In some embodiments, the towers are designed to progressively inflate (for example, beginning at the bottom or lowest level).

In some embodiments, the towers are designed to progressively inflate (for example, beginning at the top or highest level).

In some embodiments, the inflation gas is contained in a pressure cylinder that is attached to an upper surface of the tower. The supply cylinder can be raised during the inflation process. Delivery of gas from the elevated supply cylinder and other features and functions can be controlled by a radio control signal, for example.

In some embodiments, the top-down inflation can raise a top payload simultaneously while the tower is being inflated.

In some embodiments, the membrane is further configured to progressively inflate beginning at a top or highest level of the membrane during the tower inflation process.

In some embodiments, the tower further comprises: a pressure cylinder attached to an upper surface of the tower and configured to the contain the inflation gas prior to inflation of the tower; and a radio signal received configured to receive a radio control signal configure to control delivery of gas from the pressure cylinder, wherein the pressure cylinder is configured to be raised during the tower inflation process.

In some embodiments, the inflation processes is configured to raise a top payload simultaneously while the tower is being inflated.

In some embodiments, the towers are divided into multiple compartments by one or more diaphragms. These can contain valves configured to regulate flow (e.g., of the inflation gas) between compartments.

In some embodiments, one or more valves for regulating flow between compartment can comprise a pop off valve designed to automatically open at a predetermined differential pressure level.

In some embodiments, the valves are sized to restrict gas flow rates between compartments when open.

In some embodiments, two or more towers may be connected (e.g., rigidly connected at their top ends).

In some embodiments, spaces between connected or adjacent towers may be used to raise and lower useful payloads. Thus, a tower can have a vertical space is formed between the tower and the one or more other towers, and the vertical space can be configured to permit payloads to be raised and lowered (e.g., to and from the top ends of the towers).

In some embodiments, the flexible tower membranes are rolled around a spool (e.g., tightly around a smooth spool) to remove or reduce residual air or other gases so that residual gases do not interfere with inflation and/or deployment of the tower.

In some embodiments, the flexible tower membrane can be fan-folded in a vacuum environment to eliminate residual gas.

In some embodiments, the membrane is configured to be folded into a fan-folded configuration in a vacuum environment to reduce residual gasses such that the residual gases do not interfere with inflation and deployment of the tower.

In some embodiments, the flexible tower membranes are rolled tightly around a smooth spool in a vacuum chamber to further remove or reduce residual air or other gases, and/or so that residual air does not interfere with the inflation and deployment process when the tower is delivered to the use location for deployment.

In some embodiments, the flexible tower membranes are made by an extrusion process at the site of use during deployment. This can help simplify a deployment process, reduce problems with residual gas, membrane storage, and transport. This can avoid problems from fabricating at one location, placing in a storage container, and transportation to another location for deployment.

In some embodiments, the flexible tower membranes are made in flat sheets. Seams can be put in the sheets at the time of deployment. By constructing and introducing seams as part of deployment, storage, transport, and residual gas issues can be reduced or simplified. Thus, a tower can have a membrane made in flat sheets, with seams put in place where a tower is deployed.

Another aspect includes an inflatable tower configured for use in a vacuum environment. The tower can comprise a membrane configured to support a payload when inflated with an inflation gas at a gas inflation pressure of less than 100,000 pascals and greater than 0.01 pascal, wherein the gas inflation pressure is further selected such that circumferential hoop-stress levels in pressure-containing walls of the tower are less than a predetermined level. In some embodiments, a gas inflation pressure and/or other properties can be selected to minimize leakage rate and/or operate at high (near maximum safe) hoop stress levels. In some embodiments, the pressure and/or other properties can be selected to maximize tower height and/or payload capacity.

In some embodiments, an inflation gas can be chosen or designed to have sufficiently low boiling temperature at the designed inflation pressure that the gas will not condense to a liquid or solid within a defined range of temperatures in which the tower is designed to operate (e.g., during anticipated low temperature conditions).

In some embodiments, the tower has a design height between 10 and 100,000 meters and is configured (e.g., through membrane design, structure, and materials) to support one or more elevated platforms. In some embodiments, the tower has a design height of 10,000 meters or less. Such a structure (which can include multiple towers) can be configured, for example, for use by imaging systems, solar energy collectors or reflectors, communication antennas and payloads, radars, surface-vehicle tracking systems, and/or power beaming systems.

In some embodiments, one or more towers are configured to support one or more elevated weight-bearing platforms for use as one or more landing pads for arriving and departing spacecraft.

In some embodiments, one or more towers are configured to support elevated weight bearing platforms for use as one or more human-occupied habitats and work stations.

In some embodiments, a tower can comprise a vertical non-load bearing tube. For example, this tube can be centrally located (e.g., between one or more load-bearing towers).

In some embodiments, a non-load bearing tube can be configured to serve as an elevator shaft and/or a utility conduit for pipes and cables.

In some embodiments, the central tube can be elevated or lowered by pneumatic pressure controlled independently from the pressure that supports the outer tube surrounding the central tube, thereby implementing a pneumatic elevator.

In some embodiments, the central tube is configured to be elevated or lowered by pneumatic pressure controlled independently from the gas inflation pressure that supports the membrane surrounding the central tube, thereby implementing a pneumatic elevator.

BRIEF DESCRIPTION OF THE DRAWINGS

In the following figures, like number labels refer to like components in all figures.

DETAILED DESCRIPTION

Throughout the drawings, the particular shape and size of the elements illustrated may be exaggerated or otherwise vary from a particular implementation of this disclosure in order to communicate certain aspects of this disclosure.

Figure 1A:
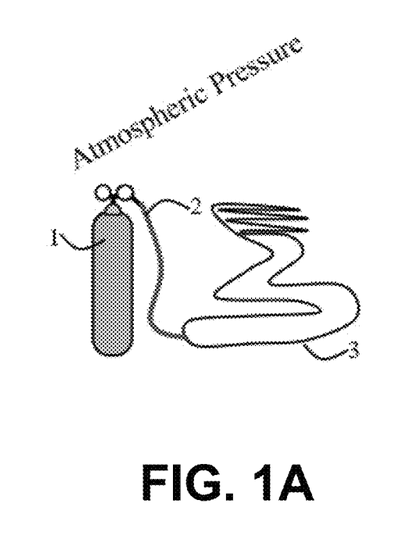
FIG. 1A illustrates the relative amount of inflation gas needed to inflate a thin-film cylindrical membrane tower.

In lunar or other low gravity environment tower construction, the amount of gas (i.e., the total mass of gas) required to inflate a structure is much less than would be needed on Earth. FIG. 1A illustrates the relative amount of inflation gas needed to inflate a thin-film cylindrical membrane tower. In this embodiment, a tower envelope 3 forms a right circular cylinder having a diameter of 10 meters and a height of 100 meters when inflated. A relatively large container of high-pressure gas 1 supplies a flow of inflation gas through a pressure regulating gas manifold 2 to the base of the collapsed tower cylinder 3. One purpose of the tower may be to elevate and support a payload mass. On Earth, the inflated envelope 3 is first filled with the inflation gas to a pressure equal to the outside ambient pressure (also referred to as atmospheric pressure). This first stage of inflation may not produce useful lift for a payload. However, the first stage of inflation may use a substantial volume of gas at atmospheric pressure to fill the envelope 3. Sea level atmospheric pressure is approximately 100,000 Pa (pascals) in units of newtons/square meter. Then, in a second step, the internal pressure of the envelope 3 is further increased to support the payload mass. The inflation gas may, for example, be stored in a high-pressure container 1 of sufficient volume to contain the total mass of gas needed for inflation.

Figure 1B:
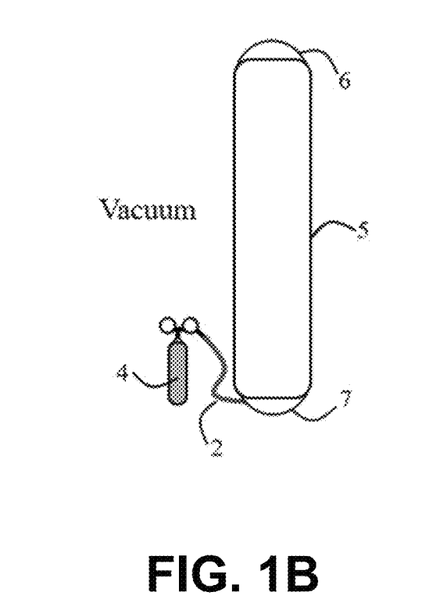
FIG. 1B illustrates inflation of an inflatable tower in a vacuum environment in accordance with aspects of this disclosure.

FIG. 1B illustrates inflation of an inflatable tower in a vacuum environment in accordance with aspects of this disclosure. A relatively small container of high-pressure gas 4 is configured to introduce a flow of pressure-regulated inflation gas through manifold 2 into a tower cylinder 5. As shown in FIG. 1B, the tower cylinder 5 includes an upper end cap 6 and a lower end cap 7. Although the upper end cap 6 and the lower end cap 7 are illustrated as having curved surfaces, the actual curvature of the upper end cap 6 and the lower end cap 7 may be greater or less than illustrated and/or the upper end cap 6 and the lower end cap 7 may have substantially no curvature in certain embodiments.

The low-pressure gas immediately expands to fill the entire volume of the tower cylinder 5. The entire structure 5 inflates because there is effectively no opposing pressure from outside of the tower cylinder 5. The gas exerts a substantially uniform pressure on all interior surfaces of the membrane forming the tower cylinder 5. The gas pressure is then increased to produce a desired lifting force on the upper interior surface of the tower cylinder 5. The lifting force can support a desired payload weight plus the weight of the tower structure 5 below that "hangs" in tension from the top surface.

The calculated lifting force may be given by the pressure P times the area A of the upper end cap 6 as shown below.

$$F=PA$$

The vertical sides of the cylinder 5, as well as the upper and lower end caps 6 and 7, experience an outward force produced by the interior pressure and also a circumferential hoop tension force within the membrane that contains the interior pressure. It is well known in pneumatic engineering design that the hoop stress increases in direct proportion to the cylinder diameter for a fixed internal pressure. Thus, for any given internal pressure, there is a maximum allowed diameter of the cylinder to not exceed a failure limit of the membrane under hoop stress tension. To construct large towers, it is desirable to keep the internal gas pressure as low as possible, consistent with providing adequate lifting force. With the strength of currently available polyimide thin films such as Kapton and using low pressure inflation, it is feasible to construct lunar towers thousands of meters tall.

The lifting capability of the cylinder 5 in an implementation of FIG. 1B can be determined as follows. The area of the end cap 6 of a 10 m diameter cylinder is A=77.5 m². With an internal gas pressure of P=100 Pa (that is about 0.001 times sea level atmospheric pressure on Earth) the lifting force is F=PA=7,750 newtons.

The weight of a mass, m, in lunar gravity is given by, $F=mg_{lunar}$, where lunar $D_{lunar}=1.6$ m/s². The mass that can be supported by this lifting force is given by:

$$m=F/g=7750/1.6=4,840 \text{ kg (kilograms)}.$$

This can be the maximum supportable mass of the payload plus the tower 5 in this example implementation. On Earth, a mass of 4840 kg weighs (4840 kg)×(2.2 lbs/kg) =10,648 pounds. On the Moon, a mass of 4840 kg weighs 7750 newtons=1,742 pounds.

From the above discussion, it can be seen that relatively small inflation pressure acting on a surface of 10 m diameter cylinder 5 can lift a usefully large load. In the illustration above, a pressure of 100 Pa (equal to about 0.001 atmosphere) is used. It is somewhat counterintuitive, but given a design starting point of a tower inflated sufficiently to support a load (e.g., half the pressure that would cause it to burst), in order to change the design to increase the tower diameter, internal gas pressure should be reduced for the larger-diameter tower; this reduction offsets the higher hoop stress resulting from merely increasing the diameter. Thus, to maintain an internal pressure of approximately half the supported hoop-stress maximum (or half the bursting point), thereby complying with hoop stress safety limits for the tower, the wider tower will have a lower pressure than the thinner tower. It may also be counterintuitive because lower pressures support greater weights when lower pressures are used to inflate wider towers. In the example above, the low pressure can support a weight of 4,800 kg (on the Moon) which is 4.8 metric tons of mass. A metric ton is about 10% larger than the common "English" ton of 2,000 lbs. Accordingly, supporting over 5 common tons is a significant payload, supported by a relatively low inflation pressure.

The particular gas used to inflate the tower 5 can be chosen to have sufficiently low boiling temperature at the designed inflation pressure such that the gas will not condense to a liquid or solid at a defined range of temperatures in which the tower is designed to operate. Thus, different gases may be chosen to inflate a particular tower 5 depending on the inflation pressure selected for the tower 5.

Figure 2:
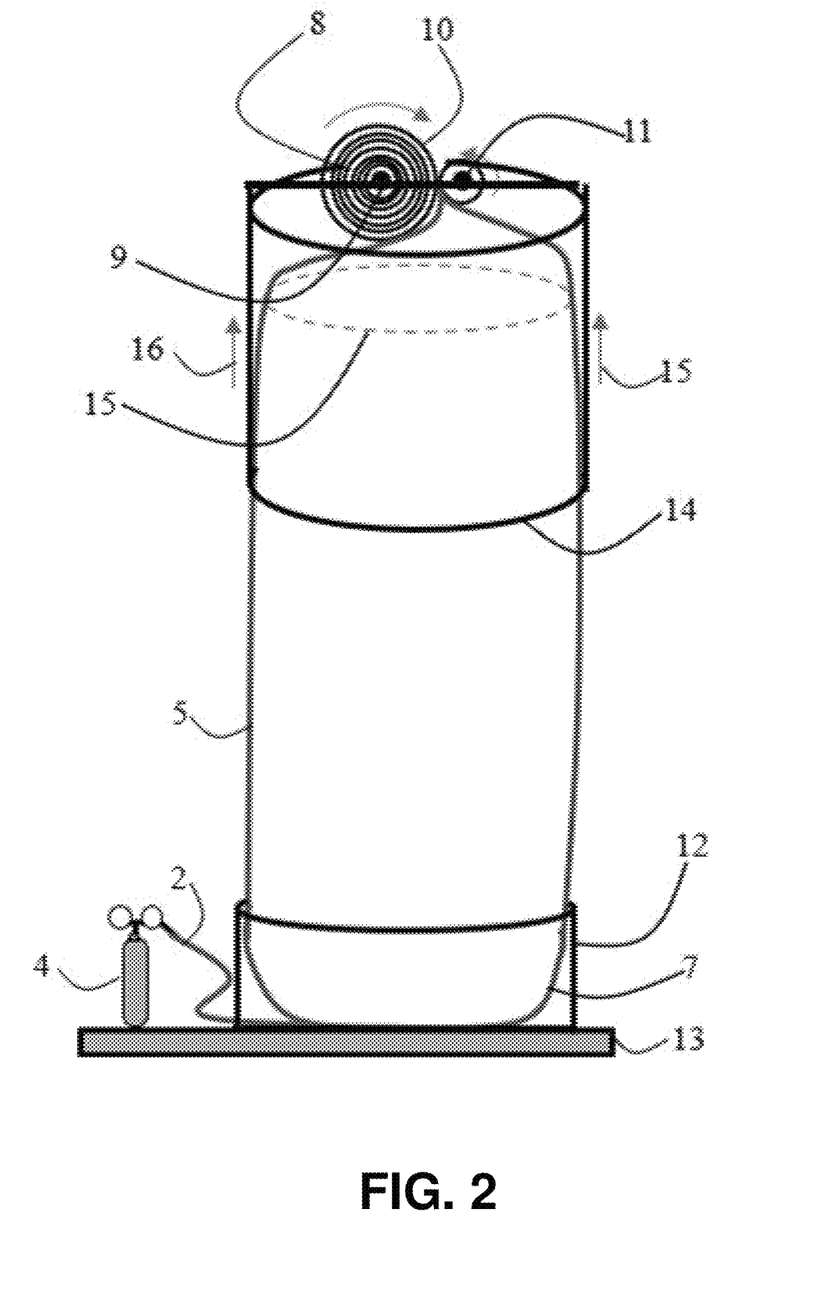
FIG. 2 illustrates the inflation of a tower that has been previously packaged into a tightly rolled coil in accordance with aspects of this disclosure.

FIG. 2 illustrates an embodiment for the controlled deployment of an inflated lunar tower 5 in accordance with aspects of this disclosure. The tower membrane 5 can be packed compactly and delivered to the lunar surface by a spacecraft. During packing, the deflated tower 5 may be flattened and rolled into a cylindrical package 8 on a rotating axle 9 (also referred to as a spool). A lower guide cylinder 12 fixes the lower end cap 7 in place on a mounting pad 13. An upper guide cylinder 14 is attached to roller mechanisms 10 and 11. As inflation gas is introduced through the lower end cap 7, pneumatic pressure on the upper cylinder cross-section area 15, indicated by dashed lines inside the inflating cylinder 5, pushes upwards the roller mechanisms 10 and 11 and the attached guide cylinder 14 as indicated by arrows 15 and 16. The tower 5 continues to inflate and increase in height until the entire membrane has been unrolled and the internal pressure has reached its design limit.

In certain embodiments, the membrane 5 may be rolled tightly around the spool 9 in a vacuum chamber to further remove or reduce residual air or other gases so that residual gasses do not interfere with the inflation and deployment process when the tower 5 is delivered to the use location for deployment. In some embodiments, the tower membrane 5 can be folded back and forth (e.g., fan-folded). For example, this can be an additional or alternative storage technique in addition to rolling the membrane onto a roller.

In some embodiments, the membrane 5 may be manufactured at the deployment site. For example, the membrane 5 can be made by an extrusion process at the site of use during deployment to simplify deployment process. This process may eliminate problems with residual gas, membrane storage, and transport in contrast to embodiments whether the membrane 5 is fabricated at one location, placed in a storage container, and transported to the location of use for deployment. In another example, the membrane 5 can be made in flat sheets with seams being put in place at the time of deployment to simplify storage, transport, and residual gas issues.

The lower end cap 7 may be shaped to help stabilize the tower 5 and provide an internal shape into which the membrane 5 can at least partially conform as the tower 5 inflates. Similarly, the upper end cap 6 may be shaped to provide a substantially flat or otherwise predictable surface onto which a load can be secured. The upper end cap 6 may also have an internal shape into which the membrane 5 can at least partially conform as the tower 5 inflates.

Figure 3:
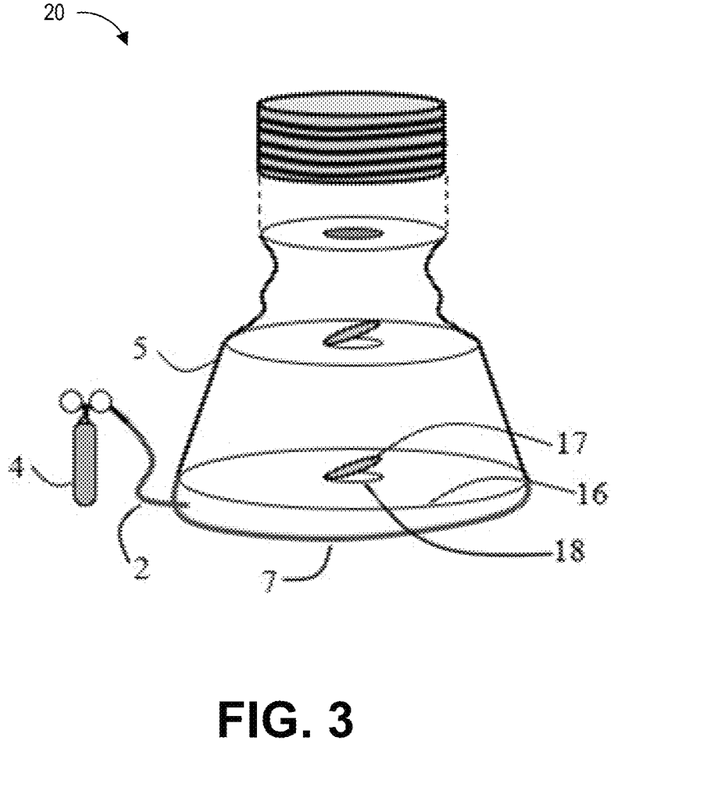
FIG. 3 illustrates progressive inflation of a conical tower according to aspects of this disclosure.

FIG. 3 illustrates progressive inflation of a cone-shaped tower 20 according to aspects of this disclosure. Thin-walled towers having a relatively high aspect ratio, for example with a height-to-diameter ratio generally exceeding 10:1, may be susceptible to buckling and collapse. One technique for mitigating buckling is to construct or configure a cone-shaped tower 20 having a relatively wide base. In this embodiment, the conical tower membrane 5 may be fabricated or provided with a relatively wide lower endcap 7. The tower membrane 5 can be further constructed with a multiplicity of horizontal diaphragms 16 configured to divide the tower 5 into vertical sections of progressively diminishing diameter. Each of the diaphragms 16 may be provided with a valve 17. In certain embodiments, the valve 17 can be a pop-off valve designed to automatically open when the pressure difference between its lower and upper sides exceeds a set value. When inflation gas is introduced into the end cap 7, pressure in the end cap 7 will rise until the pressure reaches the designed pop-off pressure of the valve 17. Then, the valve 17 opens to allow gas to flow into the next higher chamber. The opening 18 in the valve 17 is designed to restrict gas flow to into the next higher chamber to be less than or approximately equal to the inflow of inflation gas from gas manifold 2. In this manner, each higher section can progressively inflate without causing substantial partial deflation of the lower sections.

In some embodiments, the tower 20 may progressively inflate. For example, it may inflate from the top down, beginning inflation with the uppermost sections and then progressively inflate lower sections of the tower 20. Internal valves (passive or active) can help control inflation sequence and intermediate structure. Intermediate structure (e.g., during inflation) can be important if a tower is being used to lift equipment or heavy substances such as a landing pad. The progressive inflation (e.g., bottom-up or top-down) can also be implemented using a tower 20 that does not have sections but rather has continuous cylinders deployed from a roller. Continuous cylinders can help stability of the inflated sections of the tower 20 during the inflation process. The transition between (1) storing and/or transporting a compact envelope; and (2) a large, stable, inflated structure carrying a payload can be accomplished using various structures and methods. If the envelope is stored on a large roll (like a roll of carpet, for example), a portion to be inflated can pass through two pinching or transition rollers as it comes off the larger roll. Thus, as inflation occurs, the envelope can expand to effectively form a balloon-like chamber bounded by these pinching rollers. The inflating balloon can be positioned on a more rigid support structure that orients the balloon in the desired way and/or provides a foundation on which the inflatable tower can stand, for example. For a tower with circular symmetry, a relatively short stabilization collar or ring can provide upright support for a portion of the inflated section(s) near the bottom as well as supporting the previously inflated rigid cylinder above the collar. For example, the newly inflated structure can be pushed up through the support collar (e.g., through an inner opening) while inflated envelope portions rest on a rigid support portion (e.g., around the exterior thereof). This can be facilitated by an intermediate guide structure that supports uninflated envelope material and conveys it toward the rigid supporting structure during inflation. In some embodiments, the described roll, rollers, or other storage/transport structures can be located within or near the rigid support structure (e.g., collar or ring) such that the tower envelope material is fed toward the inflating tower when needed. In one example, a lunar rover can be positioned at an eventual tower central axis, allowing the feeding process to have approximately radial symmetry. The rover can carry and hold a large roller having thereon the tower's envelope. The roller can unfurl the envelope material, feeding it (e.g., upwardly) into a cone or ramp structure that leads toward a ring that surrounds the rover and roller. The feeding can occur as previously-fed envelope portions are inflated, tending to draw additional envelope portions off the roll. The envelope can slide up the cone and eventually settle on peripheral side walls with circular symmetry. The tower can thus progressively inflate, with internal gas pressure tending to draw further envelope off the roll, which envelope then forms side walls of the tower, fed in from beneath a supporting structure. A funnel or cone shape can extend from a narrower or beginning position near the roll to terminate at or near the surrounding side walls of a support structure such as the collar mentioned above. If materials are fed from within or below, the tower can eventually cover or trap the rover or roll structure. In this case, the rover or other structure can later be retrieved by tunneling under the tower, or a bottom inflated support compartment can have a built-in tunnel or opening to allow the rover to drive out after tower inflation. A rigid support structure can be dug into or otherwise constructed from Lunar regolith like a foundation or supporting basement walls under a house. Various structures can be used to aid in stable inflation, deployment, and orientation of the described tower. Sheer forces (e.g., from wind) are minimized in zero atmosphere situations such as the surface of Earth's Moon, reducing risk during inflation processes and allowing for long-term deployment without using guy lines, for example.

In some embodiments, the inflation gas can be contained in a pressure cylinder that is attached to an upper surface of the tower 20. The supply cylinder can be raised during the inflation process. Accordingly, top-down inflation does not necessarily require a long gas-supply tube. Delivery of the gas from the elevated supply cylinder can be controlled remotely (e.g., by a radio control signal) in some implementations. Top-down inflation can also be used to raise a top payload simultaneously while the tower 20 is being inflated. A stabilizing system that uses leveling sensors and feedback processors can be used to assist in this process. Moreover, a structure can have a symmetrical design configured to maintain stability during inflation, even without feedback or sensing. A wide-base design can provide such stability in both top-down and bottom-up inflation configurations. A stable approach can for example have outer compartments configured for early inflation to provide stabilizing side walls. Multiple gas inflation ports can be used, and these can be spaced strategically (e.g., symmetrically) about the perimeter of a structure to be inflated.

Figure 4A:
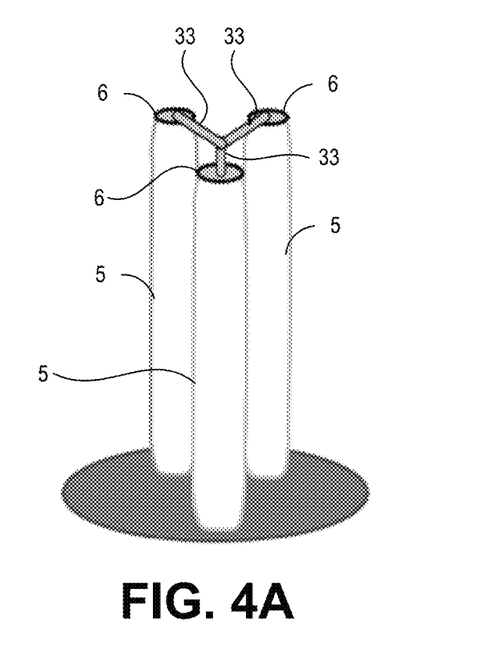
FIG. 4A illustrates an embodiment in which two or more inflatable towers are connected at their tops in accordance with aspects of this disclosure.

FIG. 4A illustrates an embodiment in which two or more inflatable towers 5 are connected at their tops in accordance with aspects of this disclosure. Connection structures 33 can be provided between multiple towers 5 and can increase the stability of the overall structure. This stability can help mitigate or address motions of the useful payload, such as during pointing maneuvers of an antenna or solar array. The connection structures 33 can include various different structures, such as rods, bars, wires, cables, or other physical elements formed of a variety of different materials. A certain margin of stability (e.g., using these or similar structures and/or configurations) can be provided to resist buckling during Moon quakes or ground vibrations due to nearby mining operations.

Figure 4B:
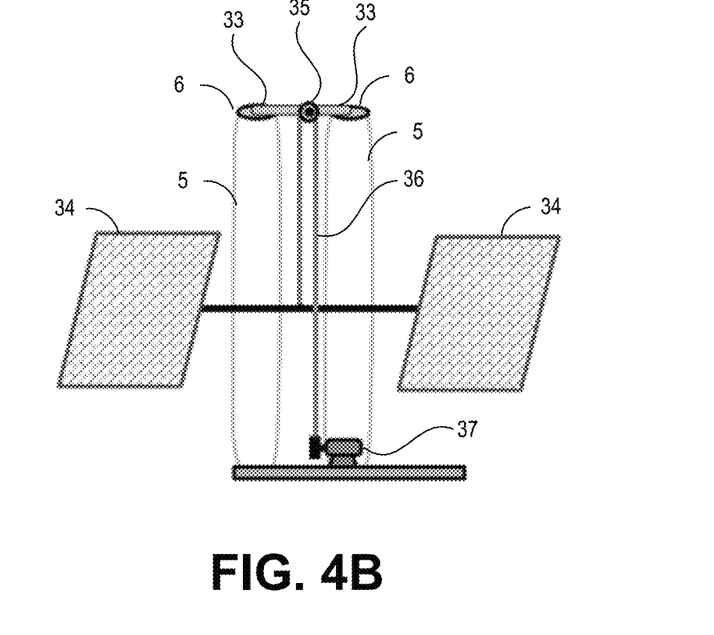
FIG. 4B illustrates another embodiment in which two or more inflatable towers are connected at their tops in accordance with aspects of this disclosure.

FIG. 4B illustrates another embodiment in which two or more inflatable towers 5 are connected at their tops in accordance with aspects of this disclosure. While useful payloads 34 may be pre-attached to a tower mechanism and can raised during the inflation operation, it is sometimes desirable to install a payload 34 at the top of a tower after inflation is complete when the tower structure is at its most stable condition. FIG. 4B illustrates a configuration that uses two or more connected towers 5 and allows for an unobstructed vertical passage along the center of mass of the overall structure and also in the separation space between the towers 5. A cable hoist mechanism or a pneumatic telescoping lift can be used to elevate the working payload 34 to the top of the tower complex. For example, the cable hoist mechanism can include a pulley 35 located at the top of the tower complex, a winch 37 at the base of the tower complex, and a cable 36 connecting the winch 37, pulley 35, and payload 34.

Pneumatically Supported Towers

Aspects of this disclosure also relate to pneumatically supported cylindrical tower structures for use on low-gravity airless bodies, such as Earth's Moon. In various embodiments, the structures can support a payload mass at altitudes far in excess of conventional tower constructions that employ rigid-lattice or tensegrity rod and cable (compression-and-tension) structural members.

Inflatable towers are particularly useful in environments such as the Moon because: (1) lack of atmosphere and wind reduces risk of sheer stress; (2) low gravity allows for less force to raise larger payloads; (3) lack of atmospheric pressure outside the inflatable allows for inflation at very low gas pressures inside the envelope (allowing in turn for increased diameters and increased payload strength).

Numerous useful benefits flow from the third point above, which can be understood based on the following points. First, hoop stress (a potential cause of failure in some environments as internal pressure bursts the envelope) is reduced at lower pressures. Hoop stress increases in direct proportion to increasing diameter of a cylindrical envelope, but extremely low internal pressures allow much more room to increase the diameter while still keeping hoop stress low enough to avoid bursting. Increasing diameter, in turn, increases the size of a payload a tower can hold, because a larger surface area can support more weight (bearing weight increases as platform area increases). Of course, a larger diameter envelope also requires more material for the side walls, which, being natively non-rigid, hang down from a top platform and thereby add to the effective weight (somewhat reducing practical remaining payload); nevertheless, existing materials (e.g., thin MYLAR® available from E.I. DuPont Corp, DuPont™ Kapton® polyimide films, polyimides, polymer films that resist stretching, etc.) having enough tensile strength to avoid bursting are still light enough so that the weight resulting from increased diameter does not fully offset the additional lifting capability from that same increase in diameter.

A second useful consequence of inflation at very low pressures is that leaks that may result from holes or rips in the envelope material will only drain the inflatable very slowly—so slowly that practical effects may not be felt for months or years, and compensatory inflation can be simple and practical. Indeed, pressures can be so low that a single, small compressed gas canister can be used to inflate and maintain pressure in a very large inflatable tower, notwithstanding leaks (e.g., from rocket debris, micro-meteors, industrial accidents, sabotage, or other sources).

One concern with low pressure inflatable towers may be that if pressure is too low, a tower can buckle (especially if a payload is offset from the center of the tower, for example). Buckling risk is reduced by increasing internal pressure (and therefore increasing hoop stress and rigidity of the tower). Thus, mitigating buckling risk as somewhat at odds with the benefits of low pressure inflation discussed above. Nevertheless, inflation does require at least some internal envelope pressure that exceeds external atmospheric pressure (e.g., Moon's effectively zero pressure vacuum environment). On the moon, lack of external atmosphere allows for inflation and envelope rigidity even with very low internal pressures (and therefore relatively low hoop stress). Accordingly, a practical inflatable tower finds a proper balance between sufficient inflation pressure (and therefore rigidity and hoop stress) to avoid buckling, while avoiding higher inflation pressures that would: (1) reduce the practical diameter of a tower—thereby limiting payload weight and height; and (2) increase risk of bursting and unmanageably-rapid leaks. Some such practical embodiments achieve this balance by inflating to approximately half the bursting limit (or 50% of the maximum hoop stress allowed by the materials and construction used). Buckling risk can also be mitigated by positioning weight toward the center of a tower's platform, which becomes easier as diameter increases (not only because the effective center grows larger, but because more and more side-wall weight is located at a greater radius, causing the center of gravity calculations to already favor the true center of that radius.

Based on the principles described above (and as further demonstrated by the example description and calculation below), a practical inflatable structure having a 100-meter diameter top platform can support almost 500 metric tons in lunar gravity to an altitude of 1,000 meters when inflated to merely 100 Pascals. If the sidewalls of an inflatable tower are formed from a strong but light material such as 0.5 mil (12.5 micron) MYLAR® available from E.I. DuPont Corp., (having a density of 1.39 g/cc), this leaves 484 metric tons in remaining payload after accounting for the weight of the tower itself. As further described below, increasing tower diameter increases both tower height and useful payload linearly.

Figure 5:
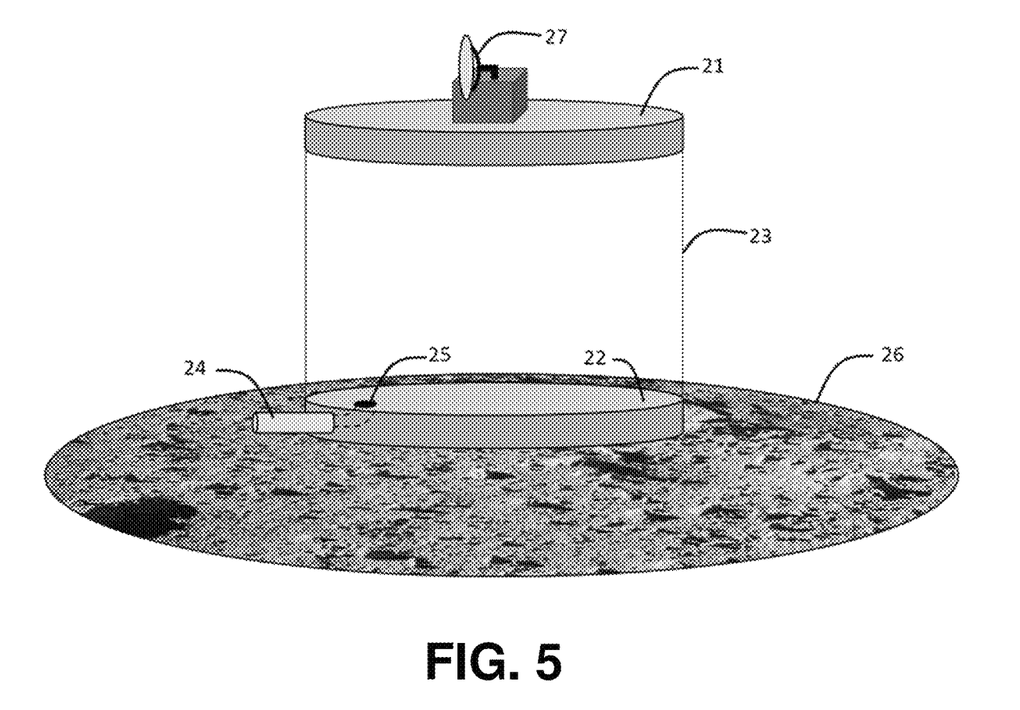
FIG. 5 illustrates a pneumatically supported tower installed on the Moon as an example in accordance with aspects of this disclosure.

FIG. 5 illustrates a pneumatically supported tower placed on the Moon as an example in accordance with aspects of this disclosure. The tower can include a flexible tubular membrane 23 and top and bottom plates 21 and 22 that form gas tight closures at the top and bottom ends respectively of the flexible tubular membrane 23. The tower can also include an inlet manifold 24 configured to permit a pressurizing gas to be introduced into the interior of the cylindrical structure 23 through an opening 25. The structure rests firmly on the surface of the Moon 26 due to lunar gravity. The top plate 21 is configured to support a useful payload 27, which is shown as a communication device as an example embodiment. Many other types of payloads 27 are possible, with additional example described below. Not shown are conventional means to maintain the internal gas pressure at a desired level and to make up for any leaks that may develop over time due, for example, to micrometeor impacts which could cause small punctures in the membrane 23. The mass of the top plate 21, the payload 27, and the hanging mass of the membrane 23 are supported against gravity by gas pressure acting against the interior surface of the top plate 21.

To increase the weight of the payload 27, it may be desirable to pressurize the cylinder 23 to a greater (e.g., its maximum safe) operating pressure. In certain implementations, the largest or most significant stress in the membrane 23 may be a circumferential tension known as hoop stress. For a fixed internal pressure, hoop stress in the wall of a cylinder increases in proportion to the diameter of the cylinder.

Therefore, a large diameter cylinder has a large internal surface area for pressurized gas to act against, resulting in large hoop stress. This straightforward relationship between cylinder diameter, internal gas pressure, and maximum allowed hoop stress can be used to design, implement, strengthen, deploy, or construct large towers with large payloads while using low internal pressures.

It is desirable to operate large diameter towers at relatively high membrane stress and relatively low inflation pressure. A typical low inflation pressure might be about 100 Pa (Pascals) or 0.001 times Earth sea-level pressure. 100,000 Pascals is approximately atmospheric pressure at Earth sea level, and in many embodiments, pressures below or up to this amount would suffice for the described structures on the moon, for example. However, higher pressures are also contemplated and feasible. Moreover, pressures up to 100,000 Pa can be used for human occupied structures. In many embodiments, 0.01 Pa is at the low end or below practical pressures for the described applications. Many embodiments can have a lower limit of 1 Pa for practical application. In some implementations, an inflatable tower according to aspects of this disclosure may have a pressure of less than 100,000 Pa and greater than 0.01 Pa. Further aspects of this disclosure relate to inflatable towers which have an inflation pressure of 750,000 Pa or less, 500,000 Pa or less, 100,000 Pa or less, 10,000 Pa or less, 1000 Pa or less, 200 Pa or less, 150 Pa or less, 100 Pa or less, and/or 50 Pa or less. This type of low pressure is desirable because leaks due to small punctures in the membrane are similarly low. High membrane stress may result from minimizing the wall thickness of a flexible membrane (and thereby advantageously minimizing the mass of the membrane) and by fabricating towers of relatively large diameter. Furthermore, a large diameter tower can have a top plate of relatively large area that can support a relatively large payload even at low inflation pressure, such as the example pressures described above.

In an example embodiment, a tower diameter of about 100 m has a top plate area of about 7854 m$^2$. At a pressure of about 100 Pa, the maximum supported weight can be calculated as F=PA=785,400 N (Newtons). In lunar gravity at about ⅙ Earth gravity, g=1.63 m/s. The maximum supported mass m (including top-plate mass plus payload mass plus hanging mass of the flexible membrane) is given by F=mg or m=F/g=490,875 kilograms=490.8 metric tons of mass.

In some example embodiments, towers may have an aspect ratio of about 10:1 height-to-diameter. A 100 m diameter tower can support about 490 metric tons of mass to an altitude of about 1,000 meters (and only 5.6 metric tons of that mass is already required to account for weight of the envelope sidewalls if they are formed from 12.5 micron mylar, leaving 484 metric tons in available remaining payload). A 300 m diameter tower can have a pressure of 100 pa support about 9 times higher mass or about 4,417 metric tons at an altitude of about 3 km (with only 267 metric tons of that mass required to account for weight of higher and thicker envelope sidewalls if they are formed from 37.5 micron mylar, leaving 4150 metric tons in available remaining payload). Calculations show that increasing the tower diameter increases both tower height and useful payload weight linearly. This desirable property allows relatively large low-pressure towers to out-perform conventional lattice construction and tensegrity tower designs in both maximum height and maximum payload limits. Thus, inflatable towers having a diameter of 100 m or greater and/or 300 m or greater may be advantageous for various applications.

There are many desirable applications for such large-diameter, tall (e.g., kilometer-high) towers that can support large payloads on low gravity airless bodies. These include but are not limited to: imaging platforms, solar energy collectors and reflectors, communication payloads, radars, surface-vehicle tracking systems, and power beaming systems, among others.

A further desirable application for large weight-bearing platforms is their use as landing pads for arriving and departing spacecraft. Spacecraft which land or depart from the lunar surface or from the surface of asteroids are known to eject high-speed sand and gravel particles in all directions due to blast from powerful rocket engines. Blasted surface ejecta can reach velocities above 1000 m/s. The ejecta can damage nearby and even distant man-made facilities. A suggested mitigation method is to require that routine spacecraft operations be conducted only from prepared hard-surfaced landing fields. Elevating such landing pads can allow powerful rocket plumes to avoid disturbing surface regolith. Thus, a landing pad that will not disturb surface regolith can be constructed without the need to pave large areas of the lunar surface. Accordingly, in certain embodiments, a landing pad for spacecraft can be advantageously located at the top of an inflatable tower in order to reduce or eliminate the generation of ejecta during spacecraft landing/liftoff. In such embodiments, special materials can be used on or near the surface to avoid melting and other harmful effects. For example, a top plate can be large and formed from relatively smooth, sturdy and/or inflammable materials.

Figure 6:
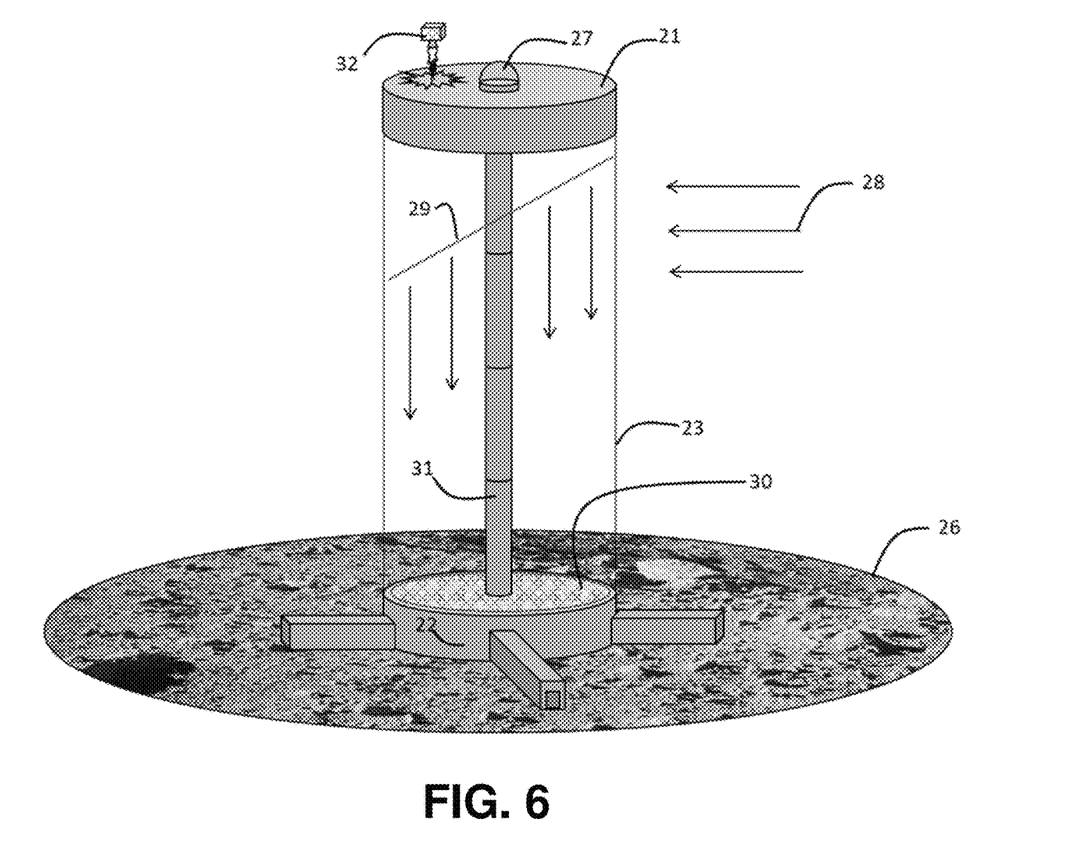
FIG. 6 illustrates a pneumatically supported tower designed to collect solar energy and support an elevated spaceport in accordance with aspects of this disclosure.

FIG. 6 illustrates a pneumatically supported tower that functions as both a Sun Flower™ solar energy collector (see, e.g., U.S. Pat. No. 10,989,443) and an elevated spaceport in accordance with aspects of this disclosure. In certain embodiments, the top and bottom plates 21 and 22 respectively may be as large as, or larger than about 300 m in diameter. For an inflation pressure of about 100 Pa, the tower height may be about 3 km. (By comparison, the Great Pyramid in Egypt measures 230 meters on a side at its base and has a height of 147 meters.) As discussed above, the total supported mass at the top of such a tower can exceed 4,000 metric tons.

Referring to FIG. 6, the flexible membrane 23 is substantially transparent to incoming solar energy 28. The tower can include a diagonal reflecting mirror 29 configured to move to track the apparent position of the Sun. Reflected solar energy is directed by the mirror 29 to the base (e.g., the bottom plate 22) of the tower where the solar energy is received on a photovoltaic array 30 and converted to electric power. In some embodiments, the base plate 22 may contain electric power conditioning and distribution equipment to service the electric power needs of a lunar base.

FIG. 6 further illustrates that the tower can include a non-load bearing central tube 31. The tube 31 can serve as an elevator shaft and/or as a utility conduit for pipes and cables which may be used to service machinery and a human habitat 27 located on the top plate 21. The top plate 21 may have a sufficient size and load carrying capacity to serve as a landing and launch pad for visiting spacecraft 32. Exhaust blast from arriving and departing spacecraft can be harmlessly dissipated at altitude without launching high-speed ejecta from the lunar or asteroid surface.

In this embodiment, the tower of FIG. 6 supports an elevated spaceport that is effectively floating on a gas pressurized to about 100 Pa (about 0.001 times Earth atmospheric pressure at sea level.) Calculations suggest that, at this or similar operating pressures, the rate of gas leakage from any small holes (e.g., that may be caused by micrometeor impacts) will be approximately 1,000 times slower that from a similar structure pressurized to one Earth atmosphere. Accordingly, structures such as those described here are unlikely to suffer catastrophic collapse, and gas loss can be compensated by ongoing or periodic pumping that may require very little energy. The required mass of pressurization gas will also be about 1000 times less than for a system pressurized to one atmosphere.

In some embodiments, the central tube 31 can be elevated or lowered by pneumatic pressure controlled independently from the pressure that supports other structures (e.g., an outer tube surrounding the central tube), thereby implementing a pneumatic elevator.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description is not intended to be exhaustive or to limit the invention to the precise form disclosed above. While specific embodiments of, and examples are described above for illustrative purposes, various equivalent modifications are possible within the scope of the disclosed invention(s), as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings provided herein can be applied to other systems, not necessarily the system described above. The elements and acts of the various embodiments described above can be extracted, subdivided, and/or combined to provide further embodiments.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

Reference throughout this specification to "some embodiments" or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics can be combined in any suitable manner, as would be apparent to one of ordinary skill in the art from this disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

Embodiments of the disclosed systems and methods can be used and/or implemented with local and/or remote devices, components, and/or modules. The term "remote" may include devices, components, and/or modules not stored locally. Thus, a remote device may include a device which is physically located in the same general area and connected via a device such as a switch or a local area network. In other situations, a remote device may also be located in a separate geographic area, such as, for example, in a different location, building, valley, and so forth.

A number of applications, publications, and external documents may be incorporated by reference herein. Any conflict or contradiction between a statement in the body text of this specification and a statement in any of the incorporated documents is to be resolved in favor of the statement in the body text.

Although described in the illustrative context of certain preferred embodiments and examples, it will be understood by those skilled in the art that the disclosure extends beyond the specifically described embodiments to other alternative embodiments and/or uses and obvious modifications and equivalents. Thus, it is intended that the scope of the claims which follow should not be limited by the particular embodiments described above.

What is claimed is:

1. A large-diameter, low-pressure inflatable tower configured for Lunar deployment, the tower comprising:
    a payload platform of between 100-300 meters in diameter;
    a polyimide thin film envelope configured to support the payload platform at a height of between 100-3,000 meters; and
    a gas source configured to inflate the envelope to a pressure of about 100 Pascals in a Lunar minimum atmosphere environment, thereby providing sufficient support for masses between approximately 490,000-4,417,000 kilograms under Lunar gravity.

2. The tower of claim 1, wherein the polyimide thin film is between 10 microns and 40 microns in thickness, having a tensile strength of between 28,000 and 34,000 psi, and has a density of approximately 1.39 gm/cc.

3. A system for supporting payloads under Lunar gravity, the system comprising:
    a payload platform supported by a membrane configured to form an inflatable gas enclosure and maintain pressure in Lunar temperatures and zero atmosphere;
    a compressed gas container configured to transport compressed gas to a Lunar deployment position; and
    a tube configured to transfer inflation gas from the compressed gas container into the inflatable gas enclosure;
    wherein the system is further configured to inflate the inflatable gas enclosure to a pressure of approximately half a maximum hoop stress for the membrane.

4. The system of claim 3, further comprising an inflatable tower for use in vacuum environments, the tower comprising the membrane, the membrane further configured to support a load when inflated with the inflation gas to a pressure less than 100,000 Pascals and greater than 0.01 Pascal.

5. The system of claim 4, wherein the inflation gas is chosen to have a sufficiently low boiling temperature at the inflation pressure of the membrane that the gas will not condense to a liquid or solid within an expected range of Lunar temperatures.

6. The system of claim 4, wherein the membrane is configured to be packaged for transport in deflated condition and rolled onto cylinders from which the membrane can be later unfurled and inflated as part of the tower inflation process.

7. The system of claim 4, wherein the membrane is configured to be packaged for transport in deflated condition and the tower membrane is further configured to be folded such that the membrane can be later unfurled and inflated as part of the tower inflation process.

8. The system of claim 4, wherein the membrane is further configured to progressively inflate beginning at a bottom or lowest level of the membrane during the tower inflation process.

9. The system of claim 4, wherein the membrane is further configured to progressively inflate beginning at a top or highest level of the membrane during the tower inflation process.

10. A system for supporting payloads under Lunar gravity, the system comprising:
    a payload platform supported by a membrane configured to form an inflatable gas enclosure and maintain pressure in Lunar temperatures and zero atmosphere;
    a compressed gas container configured to transport compressed gas to a Lunar deployment position;
    a tube configured to transfer inflation gas from the compressed gas container into the inflatable gas enclosure;
    an inflatable tower for use in vacuum environments, the tower comprising the membrane, the membrane further configured to support a load when inflated with the inflation gas to a pressure less than 100,000 Pascals and greater than 0.01 Pascal, wherein the membrane is further configured to progressively inflate beginning at a top or highest level of the membrane during the tower inflation process;
    a pressure cylinder attached to an upper surface of the tower and configured to the contain the inflation gas prior to inflation of the tower; and a radio signal received configured to receive a radio control signal configure to control delivery of gas from the pressure cylinder, wherein the pressure cylinder is configured to be raised during the tower inflation process.

11. The system of claim 9, wherein the inflation process is configured to raise a top payload simultaneously while the tower is being inflated.

12. The system of claim 4, wherein the membrane is divided into a plurality of compartments by one or more diaphragms containing valves configured to regulate flow of the inflation gas between the compartments.

13. A system for supporting payloads under Lunar gravity, the system comprising:
   a payload platform supported by a membrane configured to form an inflatable gas enclosure and maintain pressure in Lunar temperatures and zero atmosphere;
   a compressed gas container configured to transport compressed gas to a Lunar deployment position;
   a tube configured to transfer inflation gas from the compressed gas container into the inflatable gas enclosure; and
   an inflatable tower for use in vacuum environments, the tower comprising the membrane, the membrane further configured to support a load when inflated with the inflation gas to a pressure less than 100,000 Pascals and greater than 0.01 Pascal,
   wherein the membrane is divided into a plurality of compartments by one or more diaphragms containing valves configured to regulate flow of the inflation gas between the compartments, and
   wherein each of the valves comprises a pop off valve configured to automatically open at a predetermined differential pressure level.

14. The system of claim 12, wherein each of the valves is sized to restrict gas flow rates between the compartments when open.

15. The system of claim 4, wherein the tower is configured to be rigidly connected to at least one other inflatable tower at their top ends.

16. The system of claim 15, wherein a vertical space is formed between the tower and the at least one other tower, and the vertical space is configured to permit payloads to be raised and lowered to and from the top ends of the towers.

17. The system of claim 4, wherein the membrane is configured to be rolled around a spool to remove or reduce residual gasses so that the residual gasses do not interfere with inflation and deployment of the tower.

18. The system of claim 17, wherein the membrane is further configured to be rolled around the spool in a vacuum chamber to further remove or reduce residual gases.

19. The system of claim 4, wherein the membrane is configured to be folded into a fan-folded configuration in a vacuum environment to reduce residual gasses such that the residual gases do not interfere with inflation and deployment of the tower.

20. The system of claim 4, wherein the membrane is made by an extrusion process at the site of use during deployment.

21. The system of claim 4, wherein the membrane is made in flat sheets with seams put in place where the tower is deployed.

22. The system of claim 3, wherein the compressed gas container is further configured to inflate the inflatable gas enclosure to the pressure of approximately half the maximum hoop for the membrane based only on the internal pressure and the membrane diameter.

23. An inflatable tower for use in a vacuum environment, the tower comprising:
   a membrane configured to support a payload when inflated with an inflation gas at a gas inflation pressure of less than 100,000 pascals and greater than 0.01 pascal,
   wherein the gas inflation pressure is further selected such that circumferential hoop-stress levels in pressure-containing walls of the membrane are less than approximately half a maximum hoop-stress level for the membrane.

24. The tower of claim 23, wherein the inflation gas is chosen to have a sufficiently low boiling temperature at the inflation pressure of the membrane that the gas will not condense to a liquid or solid within a defined range of temperatures in which the tower is designed to operate.

25. The tower of claim 23, wherein the tower has a height between 10 meters and 100,000 meters, and wherein the membrane is further configured to support one or more elevated platforms for use by one or more of the following: imaging systems, solar energy collectors or reflectors, communication antennas and payloads, radars, surface-vehicle tracking systems, and/or power beaming systems.

26. The tower of claim 23, wherein the tower is further configured to support one or more elevated weight-bearing platforms for use as one or more landing pads for arriving and departing spacecraft.

27. The tower of claim 23, wherein the tower is further configured to support one or more elevated weight bearing platforms for use as one or more human-occupied habitats and/or work stations.

28. The tower of claim 23, further comprising:
   a central vertical non-load bearing tube.

29. The tower of claim 28, wherein the central tube is configured to serve as an elevator shaft and/or a utility conduit for pipes and cables.

30. The tower of claim 28, wherein the central tube is configured to be elevated or lowered by pneumatic pressure controlled independently from the gas inflation pressure that supports the membrane surrounding the central tube, thereby implementing a pneumatic elevator.

* * * * *